Jan. 10, 1961 G. L. HAMMON 2,967,704
SPRING ADJUSTING DEVICE
Filed Dec. 4, 1956
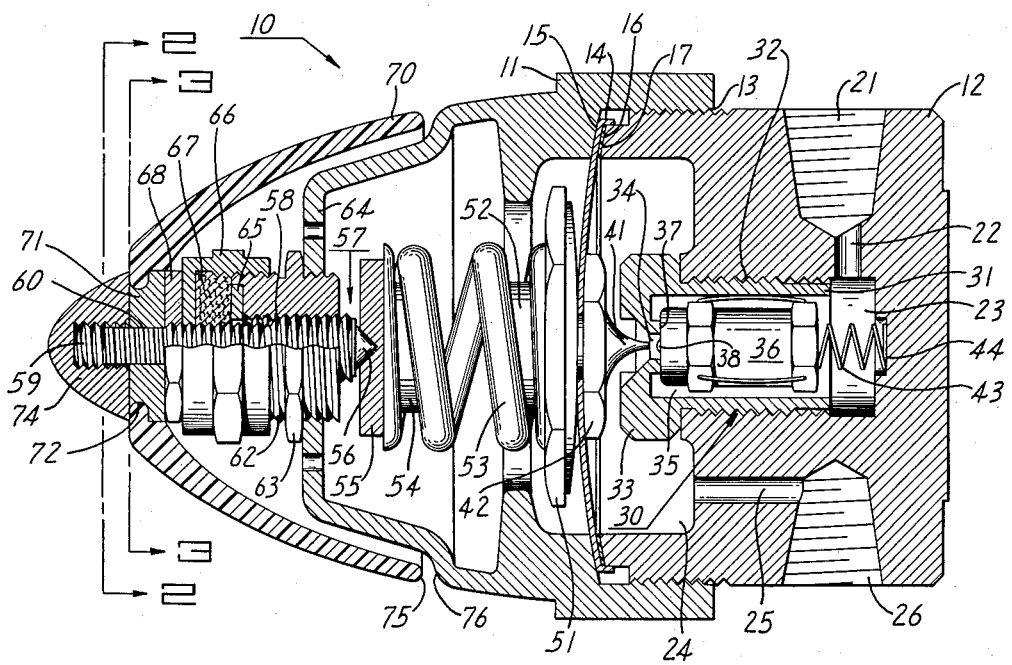
FIG_1_
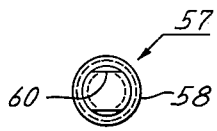
FIG_2_
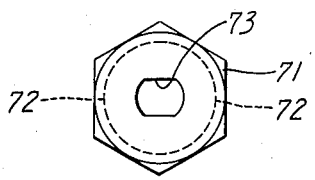
FIG_3_
INVENTOR.
George L. Hammon.
BY
Robert W. Hampton
ATTORNEY United States Patent Office 2,967,704
Patented Jan. 10, 1961

2,967,704

SPRING ADJUSTING DEVICE

George L. Hammon, 32 Ross Circle, Oakland, Calif.

Filed Dec. 4, 1956, Ser. No. 626,265

1 Claim. (Cl. 267—1)

The present invention relates to gas pressure regulators, and more particularly concerns improvements in adjusting mechanisms for such regulators.

A gas pressure regulator is employed for receiving gas from a high pressure source, such as a cylinder of compressed oxygen, and expanding the compressed gas in a regulated manner to reduce its pressure to a working level. The expansion may be performed in one or more steps, usually designated "stages," the number of stages being determined largely by the quality of regulation desired and by the difference between source pressure and working pressure. For the sake of simplicity, the present invention is described in the environment of a single-stage regulator, but it is equally applicable to multiple-stage regulators.

Regulators may be classified further as "preset" or "adjustable." The preset regulator, as its name implies, is adapted to be preadjusted for a given installation to effect a constant, selected reduction of gas pressure. The adjustable regulator, on the other hand, is adapted for convenient manual adjustment to affect any desired reduction of gas pressure within its operation range. The present invention applies to adjustable regulators and comprises improved mechanism for effecting the desired adjustments.

In reducing the pressure of a gas in any stage of a regulator, the gas is ordinarily passed through a valve cylinder which cooperates with a piston within the cylinder to form passages along the inner cylinder wall. The seating area of the piston at an outlet end of the cylinder forms a variable opening through which controlled quantities of the gas may be transferred from a relatively high pressure chamber into a relatively low pressure chamber. The regulating mechanism automatically moves the piston in either of two directions within the cylinder to control the quantity of gas which flows through the opening at the valve seat, and thereby "regulates" the gas pressure at the output.

The regulating mechanism ordinarily includes a diaphragm having means thereon for moving the valve piston in a direction for increasing the outlet gas pressure, the valve being moved in the opposite direction by other mechanisms. The outlet gas pressure is applied to one side of the diaphragm to balance the tension of a diaphragm spring on the other side of the diaphragm. By adjusting the tension of the diaphragm spring, the balance position of the diaphragm is adjusted, thereby adjusting the outlet gas pressure.

An inner end of the diaphragm spring bears against the diaphragm and an outer end is moved toward or away from the diaphragm in order to adjust the spring tension. The mechanism for moving the outer end of the diaphragm spring ordinarily comprises an adjusting screw having a tip which bears against a member supported by the outer end of the diaphragm spring. These bearing surfaces are inherently critical in operation because of the heavy forces exerted thereon which tend to cause the bearing surfaces to stick during adjustment, and tend to shorten the life of the materials comprising those surfaces.

In my U.S. Patent No. 2,597,479, granted May 20, 1952, there is disclosed and claimed a regulator adjusting mechanism wherein the adjusting screw has a metallic tip bearing against a leather insert in a cup supported by the diaphragm spring. Although the meta-to-leather bearing reduces the "metallic feel" of the adjusting mechanism during adjustment, as described in the specification of that patent, nevertheless the insert of leather, rubber, composition or other equivalent material tends to break down, harden or deform under the large forces exerted thereon. In order to reduce the pressure, or unit area force exerted on the leather insert, the inner end of the adjusting screw, which includes a centering point, is formed flat around the point, with the flat surface bearing squarely against the leather insert. The flat bearing surface also serves to inhibit deformation of the leather insert by forcing substantially the entire insert against its retaining member. However, the large flat bearing surface increases the frictional forces which must be overcome in order to adjust the relative angular position of the adjusting screw, and tends to make the bearing surfaces stick, thereby militating against smooth adjustment.

It is therefore a principal object of the present invention to provide an improved bearing between a regulator adjusting screw and a member supported by the regulator diaphragm.

A further object of the invention is to increase the life of such bearing.

Another object is to smooth the adjustment of a regulator.

A further object is to reduce the area of the surface of such a bearing wherein one surface is metallic and the other is not.

A second feature of the present invention comprises an improved control mechanism for the diaphragm spring adjusting screw. Prior art control mechanisms are represented by the adjusting means disclosed in the previously-mentioned Patent No. 2,597,479, wherein an adjusting cap is threaded to engage the adjusting screw near its outer end and is manually turned to move the screw in or out. A lock nut is threaded to engage the extreme outer end of the adjusting screw and is jammed against the cap, thereby tending to prevent the cap from moving relative to the screw during manual adjustment. With the lock nut removed, the adjusting screw may be moved in or out relative to the cap, thereby presetting the adjusting range.

Since the device disclosed in the last mentioned patent relies on frictional locking to prevent relative movement between the cap and screw, there is frequent slippage between these parts and such slippage is intolerable where an exact and immediate adjustment is required, as for example, on oxygen therapy equipment in a hospital's operating room.

It is therefore an important object of the present invention to eliminate slippage of the adjusting cap on a gas pressure regulator.

A further object is to provide positive engagement between the adjusting cap and the adjusting screw of a gas pressure regulator.

Other objects, in the environment of a gas pressure regulator, are:

To provide an improved range-presetting mechanism;

To preset the adjusting range in such manner that the adjusting cap maintains a constant, finite separation from the regulator housing at each extreme of all preset ranges; and To preset the positional relationship between the adjusting cap and the adjusting screw by means of a spacing nut which engages the adjusting screw in such manner as to prevent non-rotational movement of the spacing nut along the adjusting screw.

Other objects of the invention will appear from the following description, reference being made to the accompanying drawings, in which:

Fig. 1 is a right side sectional view of a single-stage adjustable regulator embodying the present invention;

Fig. 2 is a front view of the adjusting screw taken along the line 2—2 of Fig. 1; and Fig. 3 is a front view of the adjusting-knob insert taken along line 3—3 of Fig. 1.

*General description*

Referring to Fig. 1, the regulator in which the present invention is illustrated comprises a housing 10 including an adjusting section 11 and a valve section 12. The two sections of the housing are threaded at 13 for mutual engagement, thereby forming a hollow shell. This shell is divided internally into respective adjusting and valve sections, or compartments, by a diaphragm 14 which abuts directly against a flange 15 on the inner surface of the adjusting section 11 of the housing, and abuts, through a gasket 16, against a flange 17 on the face of the valve section 12 of the housing.

The diaphragm 14 is maintained in an equilibrium position by balanced forces exerted on its opposite sides from the respective adjusting and valve compartments of the regulator housing and, in turn, controls mechanism in the valve compartment to regulate the gas flow.

*Valve section*

The valve section of the regulator includes an inlet 21 which is connected by an inlet duct 22 to a high-pressure chamber 23, and includes an expansion chamber 24 which is connected by a second duct 25 to an outlet 26. The inlet 21 is adapted to be attached to a source of high-pressure gas, such as a cylinder of compressed oxygen. A valve mechanism, shown generally at 30 in Fig. 1, cooperates with diaphragm 14 to permit a controlled flow of gas from the high-pressure chamber 23 to the expansion chamber 24 where the gas is expanded to the desired working pressure. The expanded gas is then fed through duct 25 to the working outlet 26. The diaphragm 14 is shown in a position in which the pressure in the chamber 24 is great enough to force the diaphragm toward the left and away from a valve 30.

The valve mechanism 30 includes a cylindrical sleeve 31 having its outer surface threaded to fit a threaded opening 32 which separates the high-pressure chamber 23 from the expansion chamber 24. Sleeve 31 has a cylindrical head portion 33 of larger diameter than the threaded portion to form a shoulder which abuts an inner face of the opening 32, thereby limiting the movement of sleeve 31 toward the high-pressure chamber. The head 33 of sleeve 31 has a hole 34 through its center to connect the expansion chamber 24 to a recess 35 in sleeve 31. Recess 35, in turn, connects hole 34 to the high-pressure chamber 23.

A piston 36 is fitted into the recess 35 in sleeve 31 and has a face portion which seats against an inner valve seat ridge 37 surrounding hole 34. When piston 36 is seated tightly, it closes hole 34 and no gas can flow from the high-pressure chamber 23 to the expansion chamber 24. On the other hand, when the piston is not seated, gas flows from the high-pressure chamber through a nozzle comprising the space separating the seating face of piston 36 and the valve seat ridge 37 of sleeve 31. From the nozzle the gas flows through the hole 34 into the expansion chamber.

A pin 38 in the face portion of piston 36 cooperates with an actuating pin 41 which is integral with a pin base 42, the latter being rigidly connected to the diaphragm 14. When the force exerted on the diaphragm by the gas in the expansion chamber 24 is less than that exerted on the diaphragm by the diaphragm spring, hereinafter described, the center portion of the diaphragm is bent toward the right (as viewed in Fig. 1) by the excess force on the left, carrying pin base 42 and the actuating pin 41 with it, and thereby moving pin 41 with it, thus moving pin 38 and piston 36 to the right to open hole 34. On the other hand, when the force exerted by the gas in chamber 24 exceeds the force of the diaphragm spring, the center of diaphragm 14 is restored to its normal position, carrying pin 41 out of engagement with pin 38. In the latter case, piston 36 is moved back toward its seating position by the action of a piston spring 43, one end of which engages a recess 44 in housing 10, and the other end of which engages a recess (not shown) in piston 36.

The details of valve 30 are disclosed and claimed in my copending application Serial No. 592,059, filed June 18, 1956, now Patent No. 2,854,207.

*Adjusting section*

Mechanism in the adjusting section of the regulator is employed to exert a spring force on one side of diaphragm 14 to balance the force exerted by gas on the opposite side of the diaphragm, and includes means for enabling easy manual adjustment of that spring force.

Referring again to Fig. 1, a diaphragm plate 51 is rigidly secured to the diaphragm 14 and has a first stub shaft 52 integral therewith. Stub shaft 52 supports one end of a diaphragm spring 53, the other end of which is supported by a second stub shaft 54 that is mounted on a thrust plate 55. The thrust plate 55 is provided with a central conical recess adapted to cooperate with a conical tip 56 of an adjusting screw 57.

The diaphragm spring 53 is compressed between respective annular shoulders on the diaphragm plate and the thrust plate, and the thrust plate is moved toward or away from the diaphragm by the adjusting screw to vary the tension on the diaphragm spring 53. By varying the tension on spring 53, the position of the center of the diaphragm is varied to adjust the outlet gas pressure as hereinbefore described.

The pressure exerted on the thrust plate by the tip 56 of the adjusting screw is relatively high and tends to cause a sticking action when the adjusting screw is turned. It has been found that by forming the thrust plate 55 of a hard, metallic material and forming the tip 56 of the adjusting screw of nylon or a similar hard, plastic material, the bearing surface between these two members permits smooth turning of the adjusting screw and substantially eliminates sticking. Furthermore, by forming plate 55 of metal and tip 56 of nylon, tip 56 is retained by the walls of the recess of plate 55 and any tendency of the plastic to creep is inhibited.

The adjusting screw is mounted and adapted for longitudinal adjustment as follows.

A screw housing 62 is threaded at one end for engagement with a central threaded recess in the wall of the adjusting section of the regulator. A housing nut 63 is formed integrally with the screw housing 62, and forms a shoulder which abuts a flat outer end 64 of the adjusting compartment wall, thereby limiting the insertion distance of the screw housing into the adjusting compartment of the regulator. A center bore of the screw housing 62 is in threaded engagement with an enlarged inner portion 58 of the adjusting screw 57, and supports the adjusting screw for maintaining pressure against the thrust plate 55. The outer end of the screw housing 62 is recessed to receive a washer 65 that is mounted on the adjusting screw.

A compression nut 66 is threaded onto the screw housing 62 and has a recess containing packing material 67. The packing material is formed preferably of asbestos, lead wire, copper wire and a vegetable oil to form a gas-tight seal and to lubricate the threads of the adjusting screw. The outer end of the compression nut is threaded onto the reduced outer section of the adjusting screw. This section of the adjusting screw is of smaller diameter than the inner end 58 of that screw, forming an annular shoulder between the two sections of screw. This shoulder is employed to limit the outward movement of the adjusting screw by abutting against washer 65.

An adjusting nut 68 is threaded onto the adjusting screw 57 outwardly from the compression nut 66. Nut 68 turns with screw 57 during adjustment of the latter and abuts against the outer face of compression nut 66 to limit the inward movement of the adjusting screw. Therefore, by presetting nut 68 to a desired position along screw 57, the maximum inward movement of the adjusting screw can be controlled. In this manner, the positioning of nut 68 along screw 57 presets the range of longitudinal movement of screw 57, thereby controlling the range of tensions on spring 53 and, in turn, the range of outlet gas pressures.

A knob 70 is provided for manual adjustment of screw 57. The knob is made of plastic or other similar material which is poured around a metal insert 71, and the two are formed as an integral unit as follows. The insert 71 is cut from hexagonal stock and has an annular slot cut therein into which the plastic is poured to form a bond, preventing movement of the knob relative to the insert along the axis of the screw 57. The hexagonal form of the insert prevents rotative movement of the knob relative to the insert.

The leftmost end of screw 57 is milled away on opposite sides to form two flat unthreaded surfaces 60 (Fig. 2). A mating hole 73 (Fig. 3) is broached, or otherwise formed in the nut 71 to receive the left end of the screw, the nut snugly fitting the flat milled surfaces of the screw. A lock nut 74 having an internal thread 59 is then threaded on screw 53 to hold the insert 71 tightly against the pre-set adjusting nut 68. In this position the open skirted end 75 of the knob is maintained in a position of non-contact with the shoulder 76 of housing 11.

It has been found that when contact of the skirt 75 with shoulder 76 was used as a limit stop, an excess of frictional contact was built up at one extreme setting of the adjustment screw, and the excess force required in changing from this setting destroyed the gradual "feel" required in these devices.

Obviously, a lock nut may be provided for holding the adjustable nut 68 in a selected position; however, in the present embodiment, the force of the knob insert 71 against the nut 68 under pressure exerted by the lock nut 74 serves to hold the adjustable nut 68 in any adjusted position thereof.

Since the adjustment nut 68 and the limit stop 65 are enclosed, tampering with the adjustment limits by the uninitiated is prevented. In fact, even with the lock nut 74 and the knob 70 removed from the screw 59 the adjusted range of operation is maintained.

From the foregoing then, it is seen that the above-described arrangement for internally enclosing the adjusting means together with a conical nylon tip 56 in contact with a co-acting steel plate 55 to produce a thrust with a minimum of frictional resistance forms a combination whereby a constant "feel" is maintained with a maximum of safety.

I claim:

In a diaphragm controlled valve, a housing for said diaphragm and valve, a compression spring for biasing said diaphragm in a valve opening direction, means for increasing and decreasing the compression of said spring comprising a pressure plate having contact with one end of said spring, a packing nut threaded on said housing, a screw having two diameters the smaller of which diameters passes through said packing nut and the larger diameter of which is threaded through said housing, a stop washer freely mounted upon the smaller diameter of the screw and located between said housing and said packing nut, said stop washer contacting the larger diameter portion of the screw to limit the outward travel of the larger diameter portion of said screw in said housing, and the terminal end of the larger diameter of the screw having contact with said pressure plate, an adjustment nut threaded on the smaller diameter of the screw exteriorly of the housing and contacting the packing nut to limit the inward adjustment of said screw, an adjustment knob fixed on the smaller diameter of the screw and having a protective skirt which overlies the adjustment nut and closely surrounds said housing to thereby prevent adjustment of said adjustment nut when the knob is in place, the washer determining the outward limit of movement of said screw and the adjustment of the nut on the smaller diameter of the screw determining the inward limit of movement of travel of said screw whereby the upper and lower biasing limits of the spring may be pre-set.

References Cited in the file of this patent

UNITED STATES PATENTS

| | | |
|---|---|---|
| 1,595,809 | Nichols | Aug. 10, 1926 |
| 1,613,076 | Bird | Jan. 4, 1927 |
| 2,311,110 | Johnson | Feb. 16, 1943 |
| 2,597,479 | Hammon | May 20, 1952 |
| 2,674,829 | St. Clair | Apr. 13, 1954 |
| 2,697,599 | Vandal | Dec. 21, 1954 |